United States Patent [19]

Packalin

[11] Patent Number: 5,194,126

[45] Date of Patent: Mar. 16, 1993

[54] METHOD AND DEVICE FOR DRESSING GRINDING WHEELS

[75] Inventor: Juri A. Packalin, Penza, U.S.S.R.

[73] Assignee: Wendt GmbH, Meersbusch, Fed. Rep. of Germany

[21] Appl. No.: 778,800

[22] Filed: Oct. 17, 1991

[30] Foreign Application Priority Data

Oct. 18, 1990 [DE] Fed. Rep. of Germany ....... 4033137

[51] Int. Cl.$^5$ .......................... B23H 7/12; B23H 5/08
[52] U.S. Cl. ............................. 204/129.46; 204/217; 204/272; 219/69.15; 219/69.17
[58] Field of Search ................ 204/129.46, 217, 129.1, 204/272; 219/69.15, 69.17

[56] References Cited

U.S. PATENT DOCUMENTS

| | | | |
|---|---|---|---|
| 2,764,543 | 9/1956 | Comstock et al. | 204/129.46 X |
| 3,285,843 | 11/1966 | Blake | 204/129.46 X |
| 3,395,092 | 7/1968 | Ribes | 204/129.1 X |
| 4,236,985 | 12/1980 | Grodinsky et al. | 204/129.46 X |
| 4,849,599 | 7/1989 | Kuromatsu | 204/129.46 X |
| 4,937,416 | 6/1990 | Kubota et al. | 219/69.17 |
| 5,108,561 | 4/1992 | Kuromatsu | 204/129.46 |

FOREIGN PATENT DOCUMENTS 2917910 9/1984 Fed. Rep. of Germany .
3835166 4/1990 Fed. Rep. of Germany .

OTHER PUBLICATIONS

Soviet Engineering Research 7 (1987) Dec., No. 12, Melton Mowbray, Gt. Britain, Improvement of Contact Erosion Dressing of Diamond Wheels with an End Working Surface.

Soviet Engineering Research 7 (1987), Melton Mowbray, Gt. Britain, "Contact Erosion dressing of Diamond Wheels with a Face-Type Working Surface".

*Primary Examiner*—Donald R. Valentine
*Attorney, Agent, or Firm*—Dressler, Goldsmith, Shore, Sutker & Milnamow, Ltd.

[57] ABSTRACT

The invention relates to a method and a device for the electroerosive dressing of grinding wheels having an electrically conductive bond. The dressing tool comprises a cylindrical electrode pair divided into two, the electrodes (2, 3) of which have a different polarity and are separated from one another by insulation (4). A voltage circuit is directed via the two electrodes (2, 3). The voltage may either be a direct-current voltage of an alternating-current voltage. The dressing tool rotates and is pressed against the grinding wheel (1) with a constant force. The two dressing electrodes (2, 3) are supplied with current from a generator (7) via brushes (5,6) in such a way that it flows through the electrode (3) into the grinding wheel (1and from the latter back into the other electrode (2). The commutator-like arrangement of the two electrodes (2,3) and the brushes (5, 6) causes upon rotation a periodic alternation in the plurality of the applied voltage, which permits more uniform dressing in a simple and effective way.

4 Claims, 2 Drawing Sheets

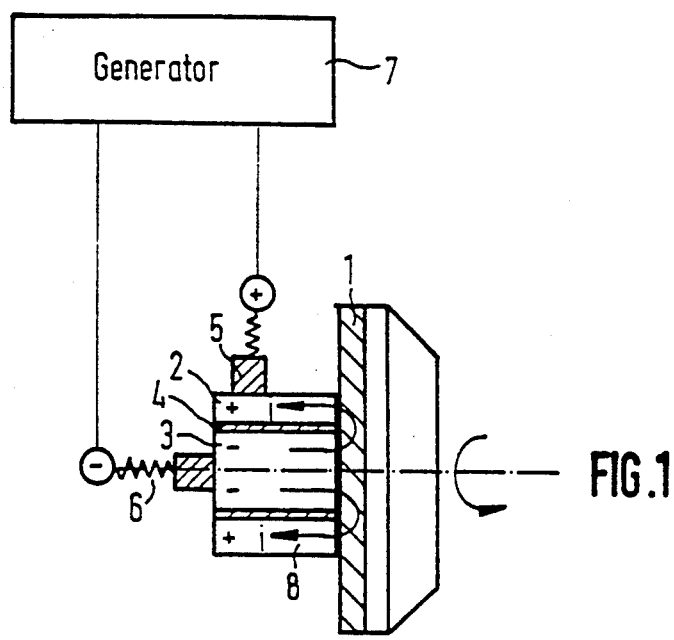
FIG. 1
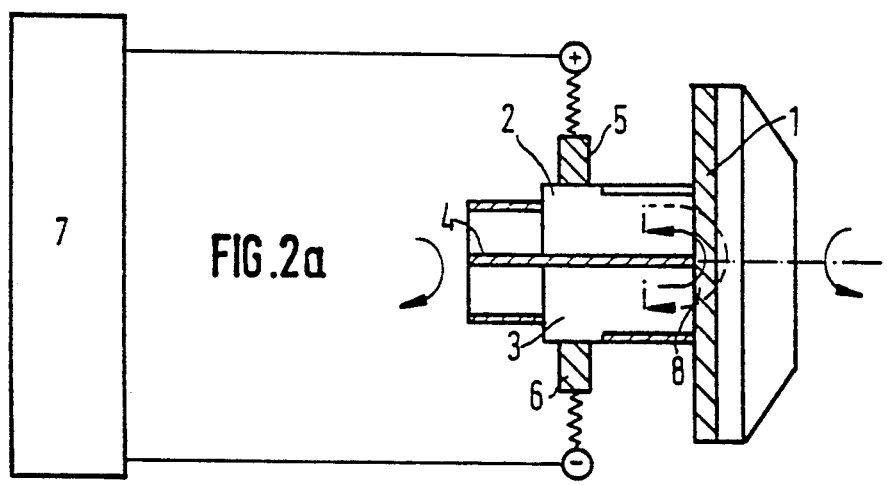
FIG. 2a
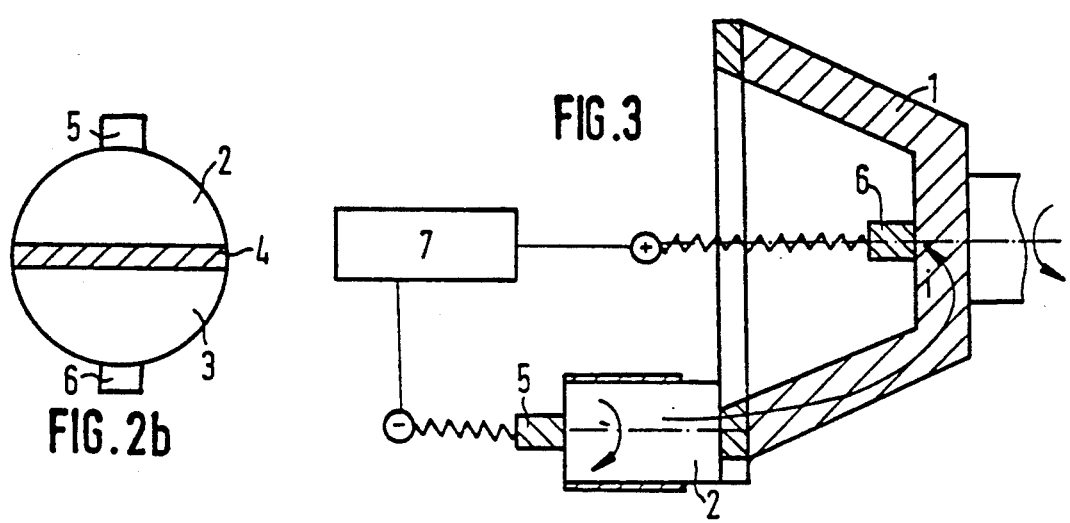
FIG. 2b
FIG. 3

METHOD AND DEVICE FOR DRESSING GRINDING WHEELS

The invention relates to a method and a device for dressing grinding wheels having an electrically conductive bond, the dressing tool and the grinding wheel being brought into mechanical contact and a voltage being applied between the same. DE 2,917,910 C2 discloses such a method and a corresponding device.

The dressing of grinding wheels is of great importance in several respects. It serves in particular to maintain and restore the gripping action of the grinding wheels and to maintain or restore the geometry of the abrasive coating. The harder the abrasive grains used in the grinding bodies and the harder the material to be machined by them, the greater is the importance of dressing.

Numerous methods are used for this purpose, of which in particular abrasive and electroerosive methods have gained practical importance.

In the abrasive methods, however, the disadvantage of considerable wear of the dressing tool and little exposure of the abrasive grains from the bond occurs, as a result of which no adequate intermediate space is created between the grains for receiving the chips during grinding. This in turn leads during usage to rapid clogging of the grinding wheel, considerable friction between bonding agent and workpiece and consequently large requisite cutting forces and high cutting temperature.

The electroerosive dressing method used as a rule is spark machining. In this method, pulse generators produce voltage pulses between an electrode and the grinding wheel to be dressed, which voltage pulses give rise to spark discharges and thus a local removal of the metal bond of the grinding wheel. The disadvantages of this method are that an expensive pulse generator is required, a suitable working gap can be maintained between electrode and grinding wheel only with difficulty and only a small dressing capacity is achieved. In addition, it is necessary to provide a collector at the grinding spindle carrying the grinding wheel in order to transmit the electric power. However, the insulation required for this purpose is always problematic in precision machines, since rigidity is lost with the insulation. In effect, stray currents repeatedly occur even with the best insulation, which stray currents, on account of their pronounced pulse character, can severely disturb the electronic control systems normally used.

From the publication mentioned at the beginning, it is known to free a tool, such as a grinding wheel, from chips and to expose the abrasive grains by a dressing electrode being pressed against the grinding wheel in parallel with the machining of a workpiece, the same pulsed voltage being applied between dressing electrode and grinding wheel as between workpiece and grinding wheel. In this known method, too, a pulse generator and a collector at the grinding spindle are therefore required.

DE 3,835,166 A1 discloses a multi-piece electrode for dressing grinding wheels having an electrically conductive bond, which electrode enables the dressing operation to be set in such a way that the intensity of the dressing is optimum at every point of the wheel surface. The principle described can be applied to both electroerosive and electrochemical dressing methods. The two parts of the electrode are part of separate electric circuits which can be activated separately.

The object of the invention, starting from the prior art mentioned at the beginning, is to provide a method and a device for dressing grinding wheels, which method and device are simple and effective in performance.

This object is achieved according to the invention in that the dressing tool is an electrode pair divided into two, the electrodes of which have a different polarity and are separated from one another by insulation, a voltage circuit being directed via the two electrodes.

The dressing tool therefore comprises both the anode and the cathode, and the applied current flows merely through the conductive bond of the grinding wheel from the electrode forming one part of the dressing tool to the other electrode part, insulated from the former, of the dressing tool. Therefore no collector or the like is required at the grinding spindle, so that all problems of insulation associated therewith are removed. In addition, by electrical isolation of the voltage source from the potential of the machine, current flow through the spindle and other sensitive parts can be reliably avoided. Alternatively, the current can also be directed via the grinding wheel in such a way that it flows back again via a single electrode, the bond and a brush fitted directly onto the grinding wheel. This is especially of advantage if the grinding-wheel surface to be dressed is so small that not the entire surface of the dressing tool is in contact with it, such as, for example, in the case of cup grinding wheels. Further advantageous configurations of the method or device according to the invention are described in the sub-claims.

In operation, a periodic sequence of electrical contacts and contact interruptions develops due to the mutual movement of the dressing tool and the grinding wheel. The moment contact takes place via projecting coating parts, the electric current flowing through destroys these coating parts by resistance heating and in addition by sparks when contact is broken. This phase of high machining intensity is characterised by high current flow. After the projecting coating parts are removed, the protruding abrasive grains of the grinding wheel remove small chips from the surface of the dressing tool. These chips produce an electric short circuit between the metallic bond of the grinding wheel and the dressing tool. The current flowing via the chips erodes the bond so that the abrasive grains are well exposed. In the process, relatively few sparks can be seen, but the chips which are torn out of the contact zone can be seen very well. The working current falls increasingly during this exposure of the abrasive grains. On account of the characteristics of the physical actions, automatic regulation of the intensity of dressing therefore occurs precisely in a way that is advantageous for the sharpening of grinding wheels.

The contact-erosive dressing method according to the invention is therefore based on the mechanical generation of electrical discharges in the cutting zone with the states, alternating with one another, of sliding contact and electrode short circuit by the chips. The individual states are not produced by a pulse generator but by the mechanical contact of the electrodes with the grinding wheel and the relative movement between them.

In practical tests, it was possible to demonstrate the great value of the method according to the invention, in particular in the machining of PKD tools with diamond grinding wheels. The contact-erosive dressing carried out continuously leads to a substantial reduction in the grinding time through greater gripping action of the dressed grinding wheels, to a clear reduction in the raggedness of the ground workpieces through the reduction in the grinding pressure, and to a substantially increased service life of the grinding wheel through less stress in the grinding operation.

Exemplary embodiments of the method and the device according to the invention are described in greater detail below with reference to a schematic drawing, in which:

FIG. 1 shows a first embodiment of a device for dressing grinding wheels;

FIG. 2a shows a second embodiment of the device;

FIG. 2b shows a plan view of the dressing tool of the second embodiment;

FIG. 3 shows a third embodiment of the device;

Figure 4:
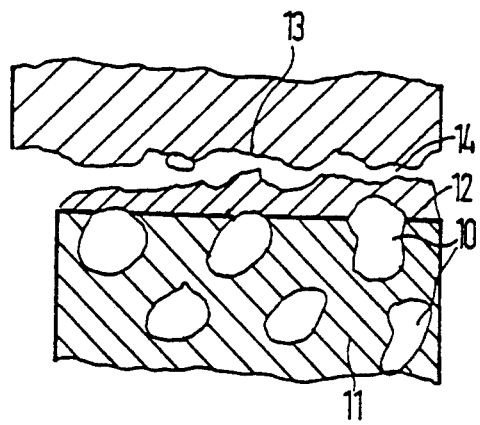
FIGS. 4, 5 and 6 show the actions at the surface of the grinding wheel during dressing and its finished surface.

FIG. 1 shows a first embodiment of a device for dressing grinding wheels. The device comprises a diamond wheel 1, a pair of electrodes 2 and 3 of a dressing tool, insulation 4 between the electrodes 2, 3 brushes 5 and 6 for feeding an electric current to the electrodes 2, 3 and a generator 7. Furthermore, the flow direction of the electric current during dressing is identified by reference numeral 8. The electrodes 2, 3 are preferably made of copper or tungsten copper. However, if need be they can also be made of brass, bronze, aluminium, iron or steel. An abrasive material can be added to the electrode material to increase the wear resistance. Dressing is effected with the use of an aqueous or oily cooling-lubricant solution. In principle, however, any grinding fluid is suitable.

In the first embodiment shown in FIG. 1, the electrodes of the dressing tool consist of a tubular, outer electrode 2 and a solid, cylindrical, inner electrode 3 which is coaxially surrounded by the outer electrode 2 and is separated from the latter by cylindrical insulation 4. By means of the brushes 5 and 6, a current having a voltage of about 10 to 40 V and a current intensity of 15 A (up to 60 A depending on the area) is passed through the inner electrode 3 via the diamond wheel 1 and the outer electrode 2 so that the electric circuit is closed by the electrodes in the flow direction 8 via the electrically conductive bond of the grinding-wheel coating set with diamonds. That is, no current flows via the mounting fixture of the diamond wheel, since the dressing tool divided into two contains both poles of the electric circuit.

FIGS. 2a and 2b show a side view of a second embodiment of the device for dressing grinding wheels and respectively a front view of the dressing tool intended for it. The dressing tool consists of a rotational body (cylinder) which is cut along its axis into two halves which are insulated from one another and thus form the two dressing electrodes 2 and 3. The current from the generator 7 is fed to these electrodes via the brushes 5 and 6 in such a way that it flows through one electrode 3 into the diamond wheel 1 and from the latter back into the other electrode 2. Due to the commutator-like arrangement of the two electrodes 2 and 3 and the brushes 5 and 6, rotation of the dressing tool causes a periodic alternation in the polarity of the applied voltage, which permits more uniform dressing.

The third embodiment of the device in FIG. 3 provides for the dressing to be effected in a unipolar manner with a single cylindrical electrode 2, the other pole of the generator being connected via the brush 6 directly to the grinding body of the cup grinding wheel 1. In this case, the length of the current path 8 is certainly increased, but here, too, the current to the working surface of the grinding wheel 1 is limited. This arrangement is particularly expedient if the surface to be dressed is relatively small, as in the present case with the cup grinding wheel in FIG. 3.

During the dressing operation, the electrodes 2 and 3 forming the dressing tool are brought into mechanical contact with the coating of the diamond wheel 1, a lubricant film being located between the electrodes 2, 3 and the grinding wheel 1. The grinding wheel 1 and the dressing tool are set in rotation, a voltage is applied to the dressing tool and an infeed of the dressing tool in the direction of the diamond wheel is effected. The infeed can be effected at a constant force of 1 N/cm$^2$ to 100 N/cm$^2$ and at a constant rate or in such a way that the working current flowing is constant. In addition, the applied current need not be especially smoothed. On the contrary, alternating current can also be used.

Figure 5:
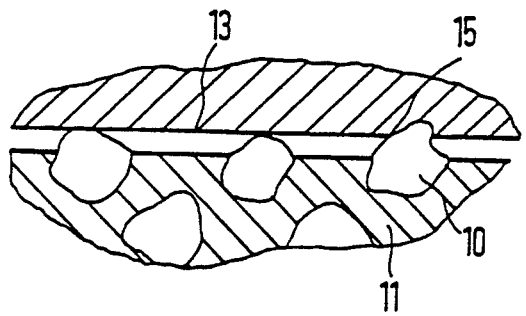
Figure 6:
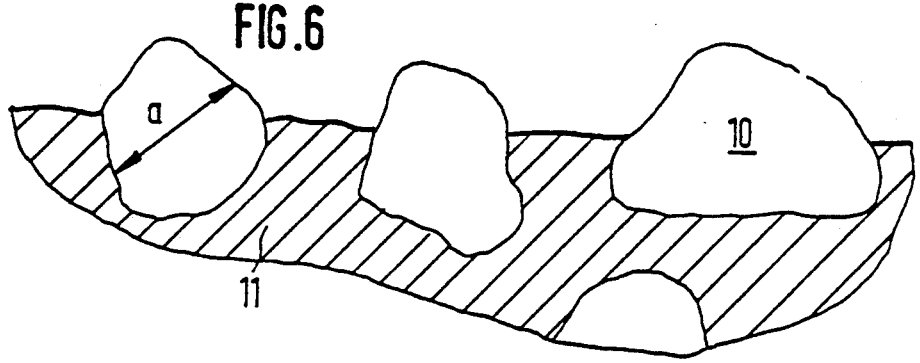

With reference to FIGS. 4 to 6, the actions occurring when dressing a grinding wheel with the device described are explained in more detail. As FIG. 4 shows, in the case of a worn grinding wheel, the diamond grains 10 of the grinding wheel do not project beyond the bond 11 or the deposits 12, and the surface 13 of the dressing tool slides over the clogged areas of the grinding wheel. The current flowing via surface point contacts 14 from the dressing tool to the grinding wheel or vice versa destroys the deposits 12 so that the diamond grains 10 are slightly exposed.

A high working current is characteristic of this state. The more the diamond grains are exposed, the more the current drops. Chips 15 are subsequently cut off from the surface 13 of the dressing tool by the partly exposed diamond grains 10 in the grinding wheel, as FIG. 5 shows. The current passing via the chips 15 destroys the metallic bond 11 of the grinding wheel at the points opposite the chips, as a result of which the diamond grains 10 are even further exposed. So that no arc develops, the generator must have a falling current-voltage characteristic.

Good exposure of the diamond grains 10 in the bond 11 is obtained with the method described and the device for carrying out the same. After weakly bonded grains have been removed, the height of the opening is about half the grain size, as FIG. 6 shows. Considerable space is thereby created for the chips arising during the grinding work. The large height of the opening reduces the probability of the bond coming in contact with the material to be ground down, the requisite cutting forces decrease by a factor of 2 to 3 and the cutting temperature drops by half. The service life of the diamond wheel is 2 to 5 times longer than in abrasive dressing methods. The wear of the dressing tool is very low. The mode of operation of the dressing method described is also especially suitable for the continuous sharpening of the grinding wheel during the machining of a workpiece by grinding. Here, the working current appearing automatically as a function of the sharpness of the abrasive coating has a positive effect. In addition, the result of the machining is not impaired by any grains of the abrasive dressing tool passing into the working process. The voltage circuit directed via the two electrodes can be a direct-current voltage circuit or an alternating-current voltage circuit.

I claim:

1. Method for the electroerosive dressing of grinding wheels having an electrically conductive bond, the dressing tool and the grinding wheel being brought into mechanical contact and a voltage being applied, wherein the dressing tool is an electrode pair divided into two, the electrodes (2, 3) of which have a different polarity and are separated from one another by insulation (4), a voltage circuit being directed via the two electrodes, and wherein the dressing tool rotates.

2. Method according to claim 1, wherein the rotational speed of the dressing tool is between 1 and 1000 rev/min.

3. Device for the electroerosive dressing of grinding wheels having an electrically conductive bond, the dressing tool and the grinding wheel being brought into mechanical contact and a voltage being applied, wherein the dressing tool is an electrode pair divided into two consisting of a tubular, outer electrode (2) and a cylindrical, inner electrode (3) which is surrounded by the outer electrode (2) and is separated from the latter by insulation (4), the two electrodes having a different polarity and being connected in a voltage circuit.

4. Device for the electroerosive dressing of grinding wheels having an electrically conductive bond, the dressing tool and the grinding wheel being brought into mechanical contact and a voltage being applied, wherein the dressing tool consists of a cylindrical rotational body which is cut along its axis of rotation into two halves which are insulated from one another and form two dressing electrodes (2, 3) having a different polarity and being connected in a voltage circuit.

* * * * *